Nov. 15, 1932.  J. GAMBLE  1,887,677

FAUCET AND THE LIKE

Filed March 2, 1932

Inventor:
John Gamble
By Thos. A. Dauny
Atty.

Patented Nov. 15, 1932

1,887,677

UNITED STATES PATENT OFFICE

JOHN GAMBLE, OF WAUKEGAN, ILLINOIS

FAUCET AND THE LIKE

Application filed March 2, 1932. Serial No. 596,385.

The present invention has to do with an improved construction of faucet and the like. One object of the invention is to provide a faucet and a valve seat therefor which are so constructed and arranged that they will last much longer and be easier to replace than those heretofore known and in use.

In this connection, a further object of the invention is to provide a faucet construction such that the same can be readily taken apart or dis-assembled for the purpose of inserting and removing the seat or substituting new and replacement seats.

Another object of the invention is to provide a construction of faucet which can be readily made from sheet metal or the like, and at very low cost of manufacture and assembly.

Another object of the invention is to provide a construction of device such that a very perfect and effective sealing is produced with the exertion of a minimum amount of pressure in the forcing of the plunger against the seat.

A further object of the invention is to provide a construction such that the device can be readily assembled or adjusted without the use of any special tools or the like, the entire operation being performed with a pair of ordinary pliers.

Other objects and uses of the invention will appear from a detailed description of the same, which consists in the features of construction, and combinations of parts hereinafter described and claimed.

Figure 1:
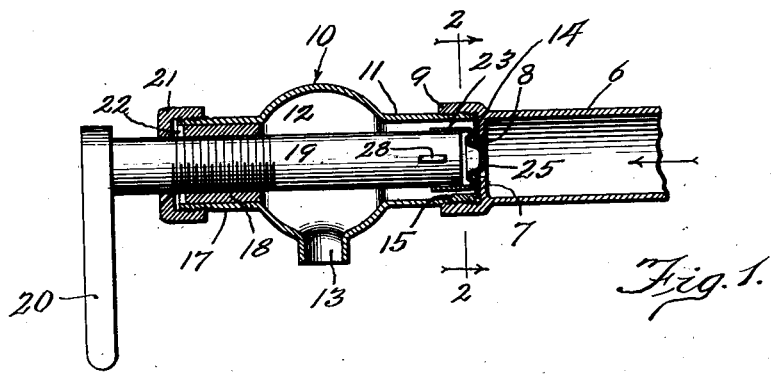
Figure 1 shows a longitudinal section through a faucet construction embodying the features of the present invention.

The device includes a tubular stem 6 through which the water or other fluid is delivered under pressure. The same is provided with an in-turned flange 7 which has a central orifice or opening 8 through which the liquid is passed. The flange 7 serves to provide a forwardly facing seat against which the washer presently to be explained is mounted.

There is a forwardly projecting internally threaded neck 9 on the stem 6 beyond the position of the flange 7. There is also a hollow valve chamber 10, having the neck or stem 11, which is externally threaded and takes into the flange 9. This valve chamber 10 is preferably provided with a central spherical chamber 12, which is provided at one side of the spout or nozzle 13 through which the water or other liquid is delivered.

The circular washer or seat 14 is set square against the flange 7 at the delivery or discharge side thereof and is of sufficient size to be clamped and held in place by the end of the neck 11 when the parts are threaded tightly together, it being understood that the outer edge of the washer 14 is clamped in place under these conditions.

The neck 11 is provided at one side with an internal rib or bead 15, which engages in a notch 16 of the washer 14 so as to retain said washer against rotation on the flange 7 and irrespective of any clamping action by the end of the neck 11.

The body 10 is also provided with another outwardly extending neck 17 into which there is set a threaded insert 18. The valve stem 19 extends through and is threaded into said insert 18, and is provided with an operating handle or head 20, by means of which the stem may be conveniently turned. Sometimes, it will be desirable to thread a union nut 21 on the end of the neck 17 so that suitable packing material 22 may be clamped into place and around the stem 19.

Figure 3:
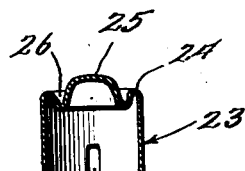
Figure 3 shows a longitudinal half section through the valve thimble which is mounted on the end of the valve stem.
Figure 4:
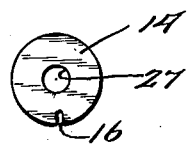
Figure 4 shows a face view of the seat washer removed from the rest of the device.
Figure 2:
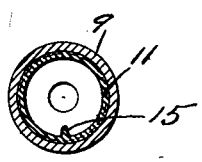
Figure 2 shows a cross section on the line 2—2 of Figure 1, looking in the direction of the arrows.

The inner end of the stem 19 carries a thimble 23. The same is conveniently made of spun sheet metal so formed as to provide an external ring or bead 24, together with a central nipple or projection 25, there being an annular depression or groove 26 between the ring 24 and the nipple 25 as clearly illustrated in Figure 3. The nipple 25 is tapered on a slight taper and is of proper size to set into the central opening 27 of the washer 14 when the valve stem is forced home. The result is that a double seating and sealing action is produced between the thimble 23 and the washer 14. The nipple 25 tightens into the washer opening 27 and the ring 24 is pressed against the surface of the washer, both of these operations taking place substantially at the same time so that a double liquid seal is produced. In fact, due to the tightening action of the slight taper of the nipple 25 in the central washer opening 27, there will be a tendency to twist or force back the washer material so as to crowd the same into the groove 26 with a supplemental or improved sealing function.

It will be understood that the cooperation of the rib 15 on the neck 11 with the groove 16 of the washer 14 serves to insure proper non-rotation of the washer irrespective of the clamping action of the end of the neck 11 towards the flange 7.

If desired, a rib 28 may be formed on the valve stem to engage a slot 29 in the valve thimble so as to cause the valve stem and thimble to rotate together.

It will be noted that a number of essential portions of the device can be readily made from sheet metal; and any suitable material such as brass, copper, sheet steel, or other material, may be used for these parts.

While I have herein shown and described only a certain embodiment of the features of my present invention, still I do not intend to limit myself thereto except as I may do so in the claims.

I claim:

1. As a new article of manufacture, a faucet comprising a tubular liquid supply stem having at its delivery end an inturned flange with a central orifice, and also having an internally threaded neck extending beyond the position of said flange, said neck being of larger diameter than the stem proper, a valve chamber having an externally threaded neck threaded into the neck of the stem, a circular flat washer laid against the delivery side face of the flange and having a central liquid delivery opening of slightly smaller size than the central orifice of the flange, the peripheral portion of the washer being clamped between the flange and the end portion of the valve chamber neck, said valve chamber being provided with a lateral liquid delivery spout, the valve chamber being provided with an outwardly extending neck, a threaded insert seated into said neck, a valve stem threaded through said insert and coaxial with the openings of the washer and flange aforesaid, means for turning the stem so as to move it longitudinally towards and from the washer, a spun sheet metal thimble seated upon and carried by the inner end of the valve stem, said thimble having a circular portion seated on the end of the valve stem and a portion projecting beyond the same in the direction of the washer, said projecting portion constituting a central nipple having a slight taper of proper size to wedge into the central opening of the washer, and said thimble also having an external ring or bead surrounding the nipple and facing towards the washer and separated from the nipple to provide a narrow backwardly extending groove, together with means for causing the thimble to rotate with the stem, whereby when the stem is turned to thread the same towards the washer, the nipple wedges into the central opening of the washer and the ring or bead of the thimble is simultaneously forced against the face of the washer, whereby a double liquid sealing action is produced between said parts, substantially as described.

2. As a new article of manufacture, a faucet comprising a tubular liquid supply stem having at its delivery end an inturned flange with a central orifice, and also having an internally threaded neck extending beyond the position of said flange, a valve chamber having an externally threaded neck threaded into the neck of the stem, a circular flat washer laid against the delivery side face of the flange and having a central liquid delivery opening of slightly smaller size than the central orifice of the flange, said valve chamber being provided with a lateral liquid delivery spout, the valve chamber being provided with an outwardly extending neck, a threaded insert seated into said neck, a valve stem threaded through said insert and coaxial with the openings of the washer and flange aforesaid, means for turning the stem so as to move it longitudinally towards and from the washer, a spun sheet metal thimble seated upon and carried by the inner end of the valve stem, said thimble having a circular portion seated on the end of the valve stem and a portion projecting beyond the same in the direction of the washer, said projecting portion constituting a central nipple having a slight taper of proper size to wedge into the central opening of the washer, and said thimble also having an external ring or bead surrounding the nipple and facing towards the washer and separated from the nipple to provide a narrow backwardly extending groove, together with means for causing the thimble to rotate with the stem, whereby when the stem is turned to thread the same towards the washer, the nipple wedges into the central opening of the washer and the ring or bead of the thimble is simultaneously forced against the face of the washer, whereby a double liquid sealing action is produced between said parts, substantially as described.

3. As a new article of manufacture, a faucet comprising a tubular liquid supply stem having at its delivery end an inturned flange with a central orifice, and also having an internally threaded neck extending beyond the position of said flange, a valve chamber having an externally threaded neck threaded into the neck of the stem, a circular flat washer laid against the delivery side face of the flange and having a central liquid delivery opening, said valve chamber being provided with a delivery spout, the valve chamber being provided with an outwardly extending neck, a threaded insert seated into said neck, a valve stem threaded through said insert and coaxial with the openings of the washer and flange aforesaid, a spun sheet metal thimble seated upon and carried by the inner end of the valve stem, said thimble having a circular portion seated on the end of the valve stem and a portion projecting beyond the same in the direction of the washer, said projecting portion constituting a central nipple having a slight taper of proper size to wedge into the central opening of the washer, and said thimble also having an external ring or bead surrounding the nipple and facing towards the washer and separated from the nipple to provide a narrow backwardly extending groove, together with means for causing the thimble to rotate with the stem, whereby when the stem is turned to thread the same towards the washer, the nipple wedges into the central opening of the washer and the ring or bead of the thimble is simultaneously forced against the face of the washer, whereby a double liquid sealing action is produced between said parts, substantially as described.

4. As a new article of manufacture, a faucet including a tubular liquid supply stem having at its delivery end an inturned flange with a central orifice, a circular flat washer laid against the delivery side face of the flange and having a central liquid delivery opening, a valve stem coaxial with the openings of the washer and flange aforesaid and longitudinally movable in such coaxial relationship, a spun sheet metal thimble seated upon and carried by the inner end of the valve stem, said thimble having a circular portion seated on the end of the valve stem and a portion projecting beyond the same in the direction of the washer, said projecting portion constituting a central nipple having a slight taper of proper size to wedge into the central opening of the washer and said thimble also having an external ring or bead surrounding the nipple and facing towards the washer and separated from the nipple to provide a narrow backwardly extending groove, whereby when the stem is forced longitudinally towards the washer opening, the nipple wedges into the central opening of the washer and the ring or bead of the thimble is simultaneously forced against the face of the washer, whereby a double liquid sealing action is produced between said parts, substantially as described.

5. As a new article of manufacture, a device including a flat washer having a central circular liquid delivery opening, a valve stem coaxial with respect to said opening and longitudinally movable towards and from the washer in such coaxial relationship, a spun sheet metal thimble seated upon and carried by the inner end of the valve stem, said thimble having a central nipple of slight taper and of proper size to wedge into the central opening of the washer, and said thimble also having an internal ring or bead surrounding the nipple and facing towards the washer and separated from the nipple to provide a narrow backwardly extending groove, whereby when the stem is forced towards the opening in the washer, the nipple wedges into the central opening of the washer and the ring or bead of the thimble is simultaneously forced against the face of the washer whereby a double liquid sealing action is produced between said parts, substantially as described.

JOHN GAMBLE.